(12) United States Patent
Muenter et al.

(10) Patent No.: US 6,897,961 B2
(45) Date of Patent: May 24, 2005

(54) HETERODYNE LATERAL GRATING INTERFEROMETRIC ENCODER

(75) Inventors: Steven E. Muenter, Van Nuys, CA (US); Kenneth C. Widen, Topanga, CA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 10/394,930

(22) Filed: Mar. 19, 2003

(65) Prior Publication Data
US 2004/0184037 A1 Sep. 23, 2004

(51) Int. Cl.[7] ................................................. G01B 9/02
(52) U.S. Cl. ....................................... 356/486; 356/499
(58) Field of Search ................................ 356/484, 485, 356/486, 487, 488, 499, 521; 359/239, 240, 285, 287; 250/231.14

(56) References Cited

U.S. PATENT DOCUMENTS 3,891,321 A * 6/1975 Hock .......................... 356/488
3,930,734 A * 1/1976 Holly et al. .................. 356/488
5,663,794 A * 9/1997 Ishizuka ...................... 356/499
6,204,926 B1 * 3/2001 Maznev et al. .............. 356/521
6,490,390 B1 * 12/2002 Wilcox .......................... 385/27

* cited by examiner

Primary Examiner—Gregory J. Toatley, Jr.
Assistant Examiner—Michael A. Lyons
(74) Attorney, Agent, or Firm—Thompson Coburn LLP

(57) ABSTRACT

A heterodyne lateral grating interferometer having a laser signal received by an AOM which generates several defracted order beams including a zero order beam and higher order beams. A lens system reimages the defracted order beams onto a stationary phase grating. An RF drive signal is received by the AOM such that the spatial frequency of the traveling phase grating of the AOM is responsive to the frequency of the RF drive signal, and the optical phase modulation depth of the traveling phase grating is responsive to the power of the RF drive signal. A phase detector determines the phase of the zero order beam from the stationary phase grating with respect to the phase of the RF drive signal.

12 Claims, 2 Drawing Sheets

HETERODYNE LATERAL GRATING INTERFEROMETRIC ENCODER

BACKGROUND OF THE INVENTION

This invention relates to a heterodyne lateral grating interferometric encoder, and more particularly to such an encoder with improved modulation. Interferometers of this type are used in applications requiring relative angular measurements with submicroradian resolution and repeatability.

There are a number of problems associated with such interferometers that the presents invention addresses. A heterodyne lateral grating interferometric encoder requires the generation of an optical beam containing a sweeping sinusoidal fringe field. A Mach-Zender interferometer with acousto-optic modulators (referred to as Bragg cells or AOMs) is typically used for this purpose. Such interferometers are comprised of multiple mirrors, AOMs, and beam splitters, and alignment of all these components is difficult.

Moreover, each AOM produces a frequency shift on the first order diffracted output beam for use in the interferometer. However, much optical power can be lost in the unused orders. In addition, the use of binary or amplitude modulated gratings results in further inefficiency. As a result, the use of a higher power laser for the input to the interferometer is required.

In addition, a reference signal is required for the processing electronics that calculate the lateral position of the test grating. Additional optical components, a second reference grating and another photodetector are required to generate this electronic reference signal.

SUMMARY OF THE INVENTION

The proposed modulation technique of the present invention utilizes the inherent properties of a single AOM to produce the necessary beams for use in a heterodyne lateral grating interferometer. The AOM produces a sweeping phase modulated field. Phase modulation allows all of the input optical power to the AOM to be utilized. The lateral position of a stationary phase grating is detected by interfering the phase modulated field with the stationary phase grating. Phase interference allows all of the optical power to be utilized to generate a 100% amplitude modulation depth optical signal for detection by a photodetector.

Unlike a Mach-Zender interferometer, the interferometer of the present invention does not require splitting the beam into two legs to produce the heterodyne modulation. In accordance with the present invention, the zero order beam from the AOM acts like the reference against which the higher order beams are interfered. Since all the beams travel through nearly identical optical paths, the sensitivity to differential path error sources is greatly reduced, thereby significantly reducing sensitivity to typical error sources such as vibration of optical components, air turbulence, and thermal gradients.

Further in accordance with the present invention, the frequency of the optical signal is the same as the RF drive signal. This allows the RF drive signal to be used as the reference signal for the processing electronics eliminating the need for a reference grating. This technique requires fewer optical components, and is optically more efficient allowing the use of a lower power laser.

Further features and advantages of the present invention, as well as the structure and operation of various embodiments of the present invention, are described in detail below with reference to the accompanying drawings.

DESCRIPTION OF PREFERRED EMBODIMENTS

Figure 1:
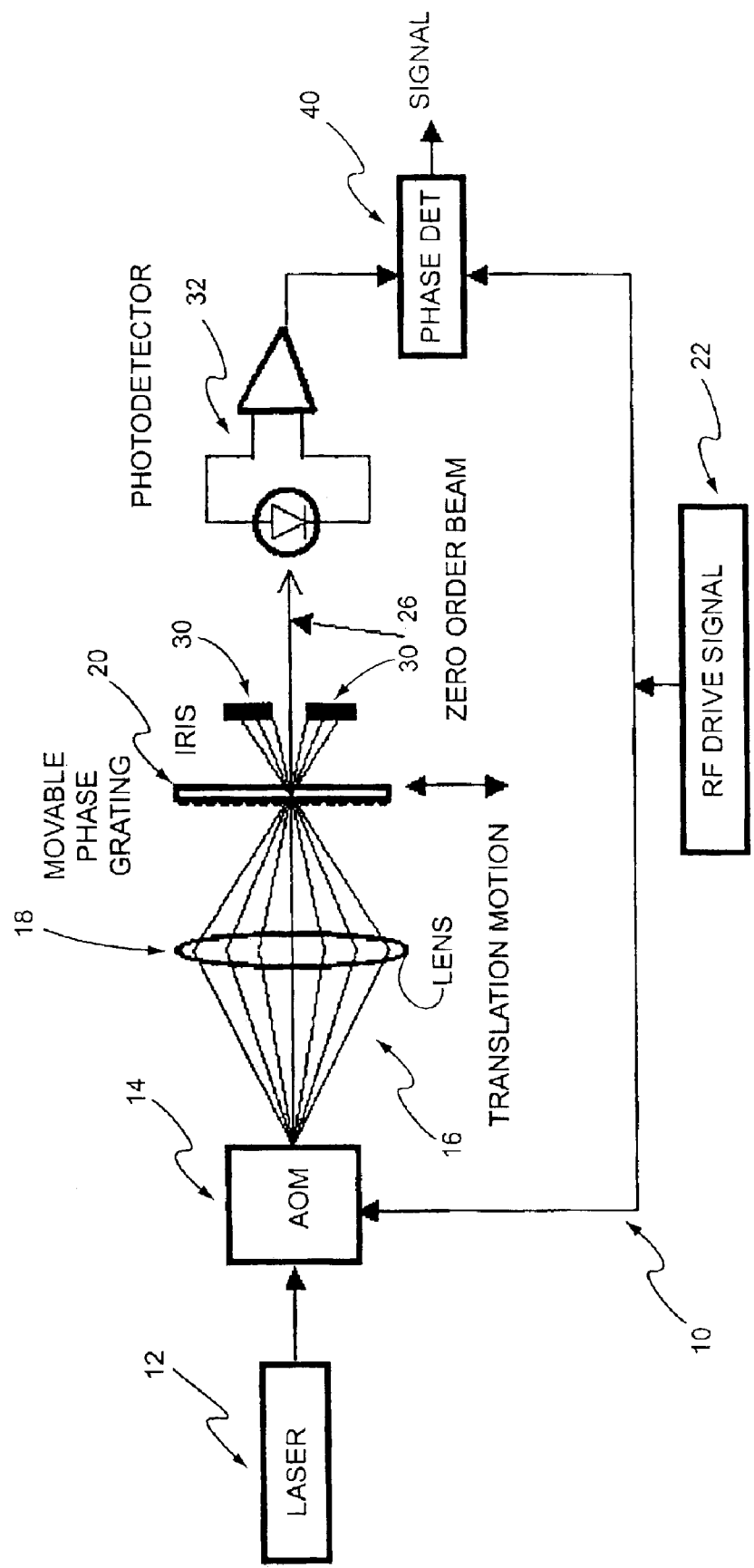
FIG. 1 is a diagram of a heterodyne lateral grating interferometric encoder of the present invention.

With reference to the diagram of FIG. 1, there is shown a heterodyne lateral grating interferometric encoder 10 of the present invention. The output from a laser 12 passes through an AOM 14 which can be considered as a traveling phase grating. The traveling phase grating in the AOM produces several diffracted order beams 16. A lens system 18 reimages the beams from the AOM onto a stationary phase grating 20. In accordance with this embodiment, the stationary phase grating may have a spatial frequency to match the spatial frequency of the beams, and an optical phase modulation depth of approximately 1.2 radians.

Figure 2:
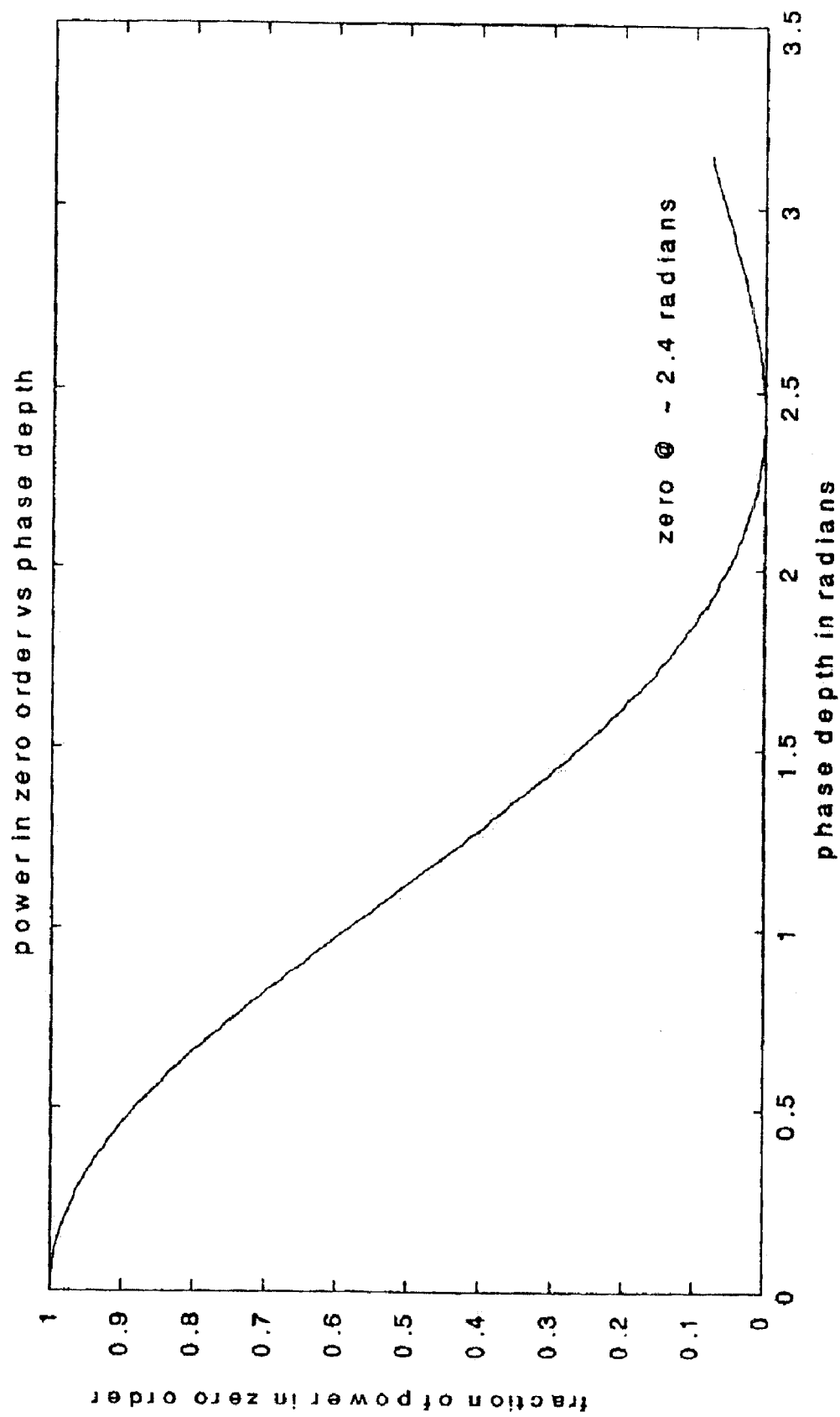
FIG. 2 is a graph showing the intensity in the zero order optical beam as a function of phase modulation depth in accordance with the present invention.

The spatial frequency of the traveling phase grating is determined by the RF drive frequency of an RF driver 22 divided by the acoustic velocity of the AOM material. Therefore, the rate at which the traveling phase grating sweeps is determined by the RF drive frequency. The optical phase modulation depth is determined by the RF drive power which, in accordance with this embodiment, may be adjusted to give an optical phase modulation depth of approximately 1.2 radians As the image of the traveling phase grating interferes with the stationary phase grating 20, the constructive and destructive interference of the two phase gratings produces an intensity modulation on the zero order optical beam 26 as described by a zero order Bessel function. The higher order beams are blocked by an iris 30 allowing only the intensity of the zero order beam 26 to be detected by a photodetector 32. For example, when the phase gratings interfere destructively, a total optical modulation depth of zero radians directs all the optical power into the zero order beam producing maximum intensity at the photodetector. When the gratings interfere constructively, a total optical modulation depth of 2.4 radians directs all the power out of the zero order beam and into the higher orders beams. The graph of FIG. 2 shows the intensity in the zero order optical beam as a function of phase modulation depth.

The amplitude modulated optical signal is detected by the photodetector and converted into an electronic signal. The lateral position of the stationary phase grating is determined by measuring the phase of the photodetector signal with respect to the phase of the RF drive signal by a phase detector 40. A translation of the stationary phase grating by a distance equal to one period of the grating's spatial frequency produces a 360° phase shift of the photodetector signal. The relative translation displacement of the phase grating from one position to another position can be determined by integrating the total phase shift of the photodetector signal between the two position.

In addition to transmissive phase gratings as described, it is to be understood that reflective phase gratings could also be used.

Thus, there has been described a heterodyne lateral grating interferometric encoder with improved modulation which overcomes certain problems associated with Mach-Zender interferometers by utilizing the inherent properties of a single AOM to produce the necessary beams and a sweeping phase modulated field. The lateral position of the stationary phase grating is detected by interfering the phase modulated field with the stationary phase grating, allowing all of the optical power to be utilized. The improved interferometer of the present invention has less sensitivity to typical error sources. With the frequency of the optical signal the same as that of the RF drive signal, the RF drive signal can be used as a reference signal for the processing electronics eliminating the need for a reference grating. Fewer optical components are required, and efficiency is improved allowing the use of a lower power laser.

While the present invention has been described by reference to specific embodiments and specific uses, it should be understood that other configurations and arrangements could be constructed, and different uses could be made, without departing from the scope of the invention as set forth in the following claims.

What is claimed is:

1. A heterodyne lateral grating interferometer comprising:

a laser source for generating a laser signal, an AOM receiving said laser signal, said AOM generating several defracted order beams including a zero order beam and higher order beams, a lens system that reimages said defracted order beams from the AOM onto a stationary phase grating, an RF drive for generating an RF drive signal received by said AOM, the spatial frequency of the traveling phase grating of the AOM being responsive to the frequency of said RF drive signal, and the optical phase modulation depth of said traveling phase grating being responsive to the power of said RF drive signal, and a phase detector for determining the phase of the zero order beam from the stationary phase grating with respect to the phase of the RF drive signal.

2. The interferometer of claim 1 further comprising:

a photo detector for detecting the zero order optical signal from the stationary phase grating and converting it into an electric signal, said phase detector determining the phase of said electric signal with respect to the phase of the RF drive signal.

3. The interferometer of claim 1 wherein the spatial frequencies of said stationary phase grating and of the reimaged beams are substantially the same.

4. The interferometer of claim 1 wherein the spatial phase modulation depths of said stationary phase grating and said traveling phase grating are substantially the same.

5. The interferometer of claim 4 wherein said optical phase modulation depths are approximately 1.2 radians.

6. The interferometer of claim 1 further comprising an iris for blocking the higher order beams, allowing only the intensity of the zero order beam to be detected.

7. A method of determining the lateral position of the stationary phase grating in a heterodyne lateral grating interferometer, said method comprising the steps of:

generating a laser signal and supplying said signal to an AOM, said AOM generating several defracted order beams in response to the laser signal including a zero order beam and higher order beams, reimaging said detracted order beams from said AOM onto a stationary phase grating, generating an RF drive signal and supplying said RF drive signal to said AOM, the spatial frequency of the traveling phase grating of the AOM being responsive to the frequency of said RF drive signal, and the optical phase modulation depth of said traveling phase grating being responsive to the power of said RF drive signal, determining the phase of the zero order beam from the stationary base grating with respect to the phase of the RF drive signal, and determining the lateral position of the stationary phase grating in response to the phase of the zero order beam from the stationary phase grating with respect to the phase of the RF drive signal.

8. The method of claim 7 further comprising the steps of:

converting the zero order optical signal from the stationary phase grating into an electrical signal, said phase detector detecting the phase of said electric signal with respect to the phase of said RF drive signal.

9. The method of claim 7 further comprising the step of matching the spatial frequency of said stationary phase grating and the spatial frequency of the reimaged beams.

10. The method of claim 7 wherein the stationary phase grating and the traveling phase grating have substantially the same optical phase modulation depths.

11. The method of claim 10 wherein said optical phase modulation depths are approximately 1.2 radians.

12. The method of claim 7 further comprising the step of blocking the higher order beams, allowing only the intensity of the zero order beam to be detected.

* * * * *